Dec. 17, 1929.     D. I. REITER     1,740,266
SNAP FASTENER SOCKET AND PARTS THEREOF
Filed Feb. 7, 1929
Fig. 1.
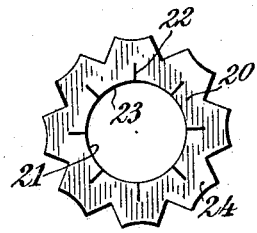
Fig. 4.
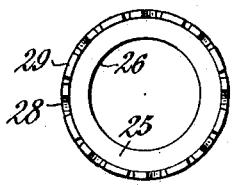
Fig. 6.
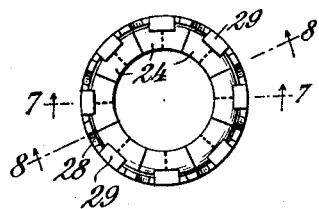
Fig. 2.
Fig. 5.
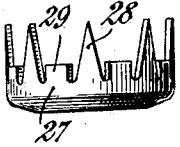
Fig. 7.
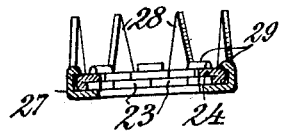
Fig. 3.
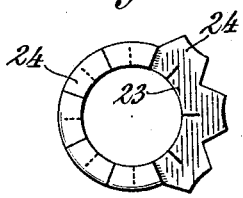
Fig. 8.
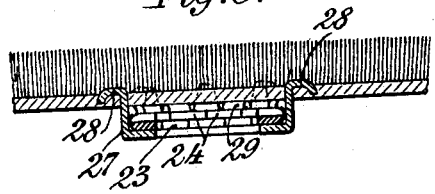
Fig. 9.
Fig. 10.
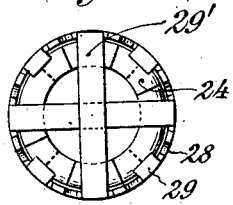
INVENTOR:
Daniel I. Reiter
By Attorneys,
Fraser, Myers & Manley.

Patented Dec. 17, 1929

1,740,266

UNITED STATES PATENT OFFICE

DANIEL I. REITER, OF NEW YORK, N. Y.

SNAP-FASTENER SOCKET AND PARTS THEREOF

Application filed February 7, 1929. Serial No. 338,063.

This invention relates to improvements in snap fastener sockets and parts thereof. Although intended to be of general application, the invention is of particular importance in the making of snap fastener sockets adapted for use as attaching elements on rugs, carpets, and in other like situations calling for unusually heavy conditions of service.

One object of the invention is to provide a relatively simple, but strong and effective, stud-retaining element for a snap fastener socket.

A further object of the invention is to provide a housing adapted for use as a means whereby the stud-retaining element may be satisfactorily attached to the article on which the socket is to be used. The housing may comprise a single piece of metal having one part adapted to serve as a seat for the stud-retaining element, parts adapted to serve as fastening elements whereby the stud-retaining element may be secured in the housing, parts to serve as attaching spurs, and parts adapted to form a thumb-piece whereby the socket may be pressed into engaging relation with a stud.

The improved stud-retaining element may be used as a part of a socket having a different type of housing, and the housing may serve as an attaching element for a different type of stud-retaining element.

In the drawings illustrating preferred forms of the invention—

Figure 1 is a face view of a blank from which a stud-retaining element embodying the invention may be made.

Fig. 2 is an edge view of the blank illustrated in Fig. 1.

Fig. 3 is a view of a partly-completed stud-retaining element which may be made from the blank illustrated in Fig. 1.

Fig. 4 is a rear view of a housing adapted to receive the stud-retaining element, illustrated in Fig. 3, when completed.

Fig. 5 is a side view of the housing illustrated in Fig. 4.

Fig. 6 is a rear view of a completed snap fastener socket made by securing the stud-retaining element, illustrated in Fig. 3, in the housing shown in Figs. 4 and 5.

Fig. 7 is a transverse sectional view of the housing illustrated in Fig. 6, the section being taken along the plane represented by the line 7—7.

Fig. 8 is a transverse sectional view of a completed socket attached to a piece of material, the section being taken along the plane represented by the line 8—8 of Fig. 6.

Fig. 9 is a conventional view of a stud element adapted for use with the socket illustrated in Figs. 6, 7 and 8.

Fig. 10 is a rear view of a modified form of snap fastener socket having long fingers bent across the back to form a thumb-piece.

A stud-retaining element embodying the features of the invention sought to be protected may be made from a blank, one appropriate form of which is illustrated in Figs. 1 and 2. This blank may comprise a sheet of metal 20, having a circular opening 21 therein, from which radiate slits 22 dividing the portion of the blank surrounding the opening into a number of inwardly-directed resilient fingers 23. The outer portion of the blank may be cut to form a plurality of outwardly-directed fingers 24, which may, by any suitable means, be bent, as indicated in Fig. 3, to form a second series of inwardly-directed fingers, the surfaces of which lie in planes parallel to the planes of the fingers of the first set.

The blank 20 may be cut to appropriate form to produce any desired number of fingers. Preferably, the fingers will be so disposed that those of one series will bridge the gaps between those of the other series, and the fingers of the second series will be bent down into contact with those of the first series so that the fingers of either series will act as reinforcing elements for the fingers of the other. Either series of fingers may be of such length as to terminate in and define the stud-receiving orifice of the finished socket. Preferably, the lengths of the fingers of both series will be such that they all cooperate to form the stud-receiving orifice, so that the fingers of each series will serve as stud-retaining elements and those of either series will serve as reinforcing elements for those of the other series.

In Fig. 3, five of the fingers 24 are indicated as having been bent inwardly to the positions which they occupy in the completed structure. Three of the elements are indicated in the positions which they occupy in the blank merely for purposes of comparison and clearness of illustration. Ordinarily, the entire set of fingers would be bent from the positions in which they are illustrated in Fig. 1 to the positions which they occupy in the finished structure as a result of one or more operations acting upon all of the fingers simultaneously.

In Figs. 4 and 5 is illustrated a housing ready to receive the stud-retaining element. This housing, in the form herein disclosed, comprises a seat 25 for the stud-retaining element, having a circular opening 26 therein of a diameter slightly larger than the stud-receiving opening 21 of the stud-retaining element. Surrounding the seat 25 is a flange or wall element 27, preferably of cylindrical form or approximately so, from which extend a plurality of fingers 28, 29. The fingers 28 may comprise a series of pointed spurs by which the snap fastener socket may be secured to the article to which it is to be attached. The fingers 29 may be spaced in alternation with the fingers 28 and may be bent inwardly and downwardly so as to serve as securing devices for the stud-retaining element after it has been inserted in the housing against the seat 25.

A completed snap fastener socket embodying the features of the invention thus far described is illustrated in Figs. 6 and 7, in which the stud-retaining element is indicated as having been securely fastened in the housing by the bending inwardly of the fingers 29, and the spurs 28 are in proper position to be thrust through the material of the article to which the socket is to be attached, after which they may be turned outwardly and downwardly to the positions indicated in Fig. 8.

The above-described socket is adapted to cooperate with a stud of appropriate form, which may be fastened in any suitable manner to the floor or to any other object or article to which it is desired to secure the article on which the socket is used. In Fig. 9 is illustrated conventionally a stud to be screwed into the floor for cooperation with a socket secured to the under side of a rig or carpet.

It will be apparent that, if the stud and socket are pressed towards each other with a sufficient degree of force, the stud will first cause the fingers 23 of the socket to be flexed inwardly, and the fingers 23 will, in turn, cause the fingers 24 to be flexed inwardly. As the stud moves into the socket, the fingers 23 will be first released by the stud and will be permitted to snap back to their normal positions. As the stud moves farther into the socket, the fingers 24 will be released and permitted to snap back into contact with the fingers 23. Should an attempt now be made to remove the socket from the stud, it will be necessary to apply sufficient force to flex the fingers 24 outwardly, but this can only be done by also flexing the fingers 23 outwardly, which serve as reinforcing elements for the fingers 24, thereby materially increasing the pulling force which must be imparted to the socket in order to disengage the same from the stud.

Preferably, the stud-retaining element will be inserted in the housing with the fingers 23 against the seat 25, although a satisfactory socket would be produced should the stud-retaining element be inserted in the reverse position.

The fingers 29 have a double function in that they not only secure the stud-retaining element in the housing, but also serve as limiting stops in determining the position of the socket with respect to the article to which it is attached, as more clearly indicated in Fig. 8 in which a piece of carpet is held firmly secured between the fingers 29 and the spurs 28. The fingers 29 serve as separators whereby the stud-retaining element is spaced from the under surface of the carpet, thereby affording room to receive the stud.

In Fig. 10 is illustrated a modified form of the invention in which two of the fingers 29 of the housing are made of a length substantially equal to its diameter. These fingers of increased length may be bent across the back of the housing to positions indicated at 29′. The ends of these fingers may extend over and be supported by portions of the flange at the opposite sides of the housing. One or more of such fingers bent across the back of the snap fastener socket will serve as a satisfactory means of keeping the material of the article, to which the socket is attached, out of the opening intended to receive the stud, and will also serve as a thumb-piece whereby the socket and stud may be pressed into their engaging relations.

The various features of the invention are not intended to be limited to the specific forms in which they have been disclosed herein for purposes of illustration, but should be regarded as inclusive of modifications and variations within the scope of the appended claims.

What is claimed is:

1. A snap fastener socket having two series of inwardly-directed, resilient, stud-retaining fingers surrounding and defining a stud-receiving orifice, the respective series being disposed one behind the other, and the fingers of each series being materially wider than the spaces between them.

2. A snap fastener socket as defined by claim 1, having the fingers of the two series so disposed that those of one series bridge the gaps between those of the other series.

3. A snap fastener socket as defined by claim 1, having the fingers of the two series in mutual contact along their adjacent surfaces, whereby the fingers of either series act as reinforcing elements with respect to the fingers of the other series.

4. A stud-retaining element for a snap fastener socket comprising a perforated disk of which the portion immediately surrounding the perforation is divided by radially-disposed cuts into a plurality of inwardly-directed stud-retaining fingers, and of which spaced elements cut from the outer portion of the disk are bent inwardly into a reinforcing relationship with respect to said fingers.

5. A stud-retaining element as defined by claim 4, of which the parts bent inwardly from the outer portion of the disk are so disposed as to bridge the gaps between the fingers formed from the inner portion of the disk.

6. A stud-retaining element as defined by claim 4, of which the elements turned inwardly from the outer portion of the disk terminate at the margin of the orifice defined by the fingers formed from the inner portion of the disk so as to provide a second series of stud-retaining fingers, the fingers of the two series being in mutual contact along their adjacent surfaces so that those of either series may act as reinforcing elements with respect to those of the other.

7. A stud-retaining element for a snap fastener socket comprising a perforated disk of metal having the part immediately surrounding the perforation divided into a series of inwardly-directed fingers and having portions cut from the outer part of the disk bent inwardly to form a second series of fingers, the fingers of one series being of a length such that their ends terminate at and define a stud-receiving orifice, and the fingers of the other series being in contact therewith so as to serve as reinforcing elements therefor.

8. A snap fastener socket comprising a stud-retaining element having two series of inwardly-directed resilient fingers terminating in and defining a stud-receiving orifice, and a housing having a perforated seat for said retaining element, a flange extending from the periphery of said seat and surrounding the same, and a series of fingers projecting from said flange, said fingers comprising in alternation a plurality of attaching spurs and a plurality of securing elements turned inwardly and downwardly from the edge of the flange into contact with the stud-retaining element.

9. A snap fastener socket as defined by claim 8, of which at least one of the fingers extending from the flange of the housing is of a length substantially equal to the diameter of the housing, said finger being bent across the back of the socket at right angles to the flange so as to form a thumb-piece by which the socket may be pressed into engaging relation with a stud.

10. A snap fastener socket as defined by claim 8, of which each of a plurality of the fingers extending from the flange is of a length substantially equal to the diameter of the socket, said fingers being bent across the back of the socket so as to cross each other at the center and form a thumb-piece by which the socket may be pressed into engaging relation with a stud.

11. A snap fastener socket comprising a stud-retaining device and a perforated, flanged disk having a series of fingers extending from its flange, said fingers comprising in alternation a plurality of attaching spurs, a plurality of holding elements for the stud-retaining device, and at least one finger, of a length substantially equal to the diameter of the flanged disk, bent across the same at right angles to the flange so as to serve as a thumb-piece by which the socket may be pressed into engaging relation with a stud.

12. A snap fastener socket as defined by claim 11, having a plurality of fingers each of a length substantially equal to the diameter of the flanged disk, said fingers being bent across its back at right angles to the flange and crossing each other at the center to form its thumb-piece.

In witness whereof, I have hereunto signed my name.

DANIEL I. REITER.